F. KONYVKA.
PISTON.
APPLICATION FILED APR. 12, 1919.
1,352,460. Patented Sept. 14, 1920.
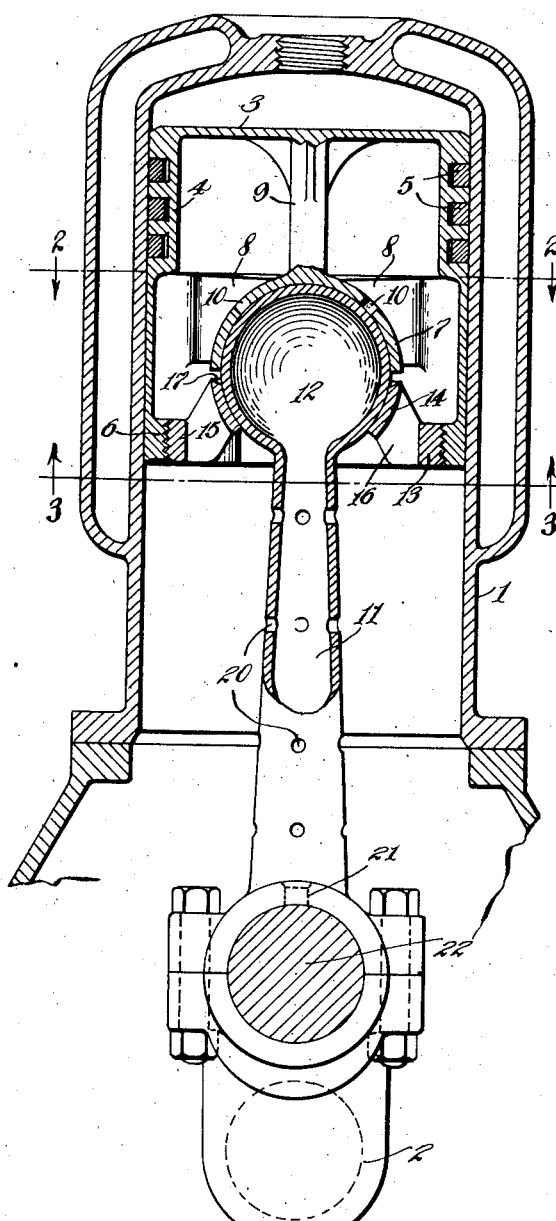
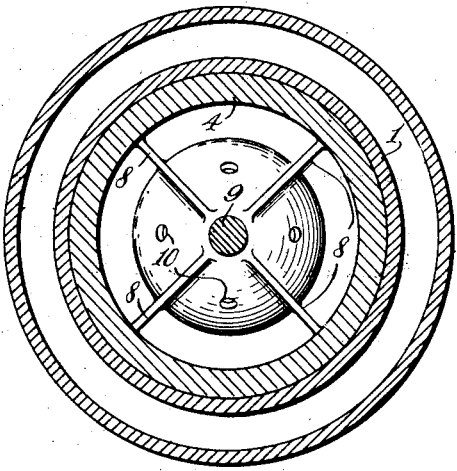
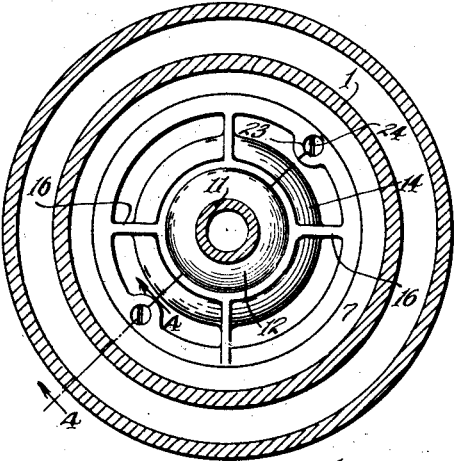
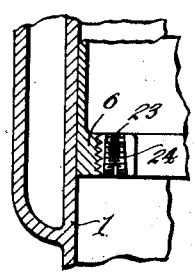
Inventor
Frank Konyvka
By John A. Bornhardt
Atty

UNITED STATES PATENT OFFICE.

FRANK KONYVKA, OF CLEVELAND, OHIO.

PISTON.

1,352,460.

Specification of Letters Patent.  Patented Sept. 14, 1920.

Application filed April 12, 1919. Serial No. 289,632.

*To all whom it may concern:*

Be it known that I, FRANK KONYVKA, a citizen of the United States, residing at Cleveland, in the county of Cuyahoga and State of Ohio, have invented certain new and useful Improvements in Pistons, of which the following is a specification.

This invention relates to improvements in pistons and connecting rod bearings and more particularly to that type of piston used in internal combustion engines. An important object of the invention is in the provision of a piston which will be so constructed as to be extremely light in weight. The material of which it is made is so distributed throughout the casting as to provide for less weight and against unequal expansion.

A further and more limited object of the invention is in the provision of a ball bearing connection between the connecting rod and the piston, thus obtaining a larger bearing surface than is obtainable in the type of connection known in the art as a wrist pin. When using a wrist pin it is necessary to use bushings to take the wear of the moving parts. With the type of connection employed in this invention it will be apparent that no bushings are required and that any wear may be taken up from the bottom of the engine without the necessary removal of the cylinder head. A further advantage in the use of the ball bearing connection lies in the fact that the mechanic is not required to "line up" the upper bearing of the connection rod with the bearing of the crank shaft and this results in a material saving of labor. A further object of the invention resides in the provision of a piston which may have the connecting rod bearing standardized to accommodate various sizes of cylinders for instance, with a two inch ball bearing connection any size piston from 2½ inches in diameter upwardly may be used, the split ball bearing nut being made of such thickness that it may be turned and threaded to accommodate the size piston employed. Further and more limited objects will become apparent and particularly set forth in the following description and claims.

In the drawings Figure 1 is a central vertical section through a cylinder of an internal combustion engine, with a piston having embodied therein the invention referred to; Fig. 2 is a horizontal section on the line 2—2 of Fig. 1; Fig. 3 is a similar section on the line 3—3 of Fig. 1, and Fig. 4 is a section on the line 4—4 of Fig. 3.

In the illustrations where like numerals designate similar parts throughout the various views, I have illustrated an engine cylinder 1 provided with a crank shaft 2 and having located therein a piston of my improved type. The piston comprises a hollow cylindrical casting open at one end and closed at the other with a top 3, from the top and extending substantially halfway of the piston the annular walls are made thicker as shown at 4 and is provided with grooves for piston rings 5. Below this portion the wall is made considerably thinner to a point near the bottom of the piston at which point the wall is again thickened as shown at 6 to provide material for an internal thread for a purpose to be described. Inside of the piston and substantially at the center a semi-spherical socket 7 is suspended from the annular side walls by means of radial ribs 8, these being four in number. For the purpose of strengthening the top 3 at the center, a post 9 projects downwardly therefrom and is supported at the top of the socket 7. Oil holes 10 are provided in the socket 7 for a purpose to be described. A pitman or connecting rod 11 has connection in the usual manner with the crank shaft 2 but at the top is provided with a hollow ball 12, said ball being adapted to fit in the socket 7 and to be retained in place by means of a peculiarly shaped split nut 13, having cast integral therewith the lower half of a ball socket 14, suspended from the annular threaded portion 15 of the nut by four radial ribs 16. The socket 14 is open at the bottom to allow the hollow shaft portion 11 of the connecting rod to project therethrough. For the purpose of assembling it is necessary to make the aforementioned nut in two halves as shown in Fig. 3. The socket 14 is provided at and around its top edge with an angular depression 17, which serves as a well for oil, the oil being carried to this point by the splash of the crank shaft. Thus it will be seen that by means of the holes in the upper socket 7 and the well or depression 17, formed at the top of the lower socket 14, the two spherical surfaces of the ball and the sockets are thoroughly lubricated at all times.

Upon reference to Fig. 1 it will be seen that the shank portion 11 of the connecting rod is hollow and is provided with a plurality of apertures 20, which will allow oil to be carried through them to a port 21, indicated in dotted lines, to the bearing 22 of the crank shaft. In Figs. 3 and 4 it will be seen that the split nut is provided at each of its ends with one-half of an internally threaded tapered bore 23 into which is threaded a tapered screw 24. The reason for this is obvious. After the desired adjustment has been obtained upon the ball bearing within the piston, by drawing the nut toward the upper socket 7, the nut may be locked in place by spreading the two halves outwardly and toward the piston walls by means of the tapered screws 24. It will also be seen that this can be accomplished by the simple expedient of removing the crank case cover with which all engines of this type are provided, and reaching into the bottom of the cylinder with the necessary tool. This obviates the necessity of removing the cylinder head when it is desired to take up for wear in the bearings and consequently reduces the labor to a minimum.

I claim—

1. A hollow piston having a central socket adapted to receive a ball at the end of a connecting rod, and a retaining nut secured in the end of the piston, said piston having spaced supporting ribs between the socket and the wall of the piston and holes from said spaces into the socket, and the nut having openings connecting said spaces and the space in the crank case, whereby oil may be splashed through the openings into said spaces.

2. A hollow piston having a central semi-spherical socket spaced from the wall thereof and spaced ribs connecting said socket and wall, said socket being adapted to receive a ball at the end of a connecting rod, and a retaining nut screwed into the end of the piston, said nut having an annular socket portion adapted to engage said ball, said socket portion being spaced from the outer part of the nut, and spaced ribs connecting said outer part and the socket portion of the nut.

In testimony whereof, I do affix my signature in presence of two witnesses.

FRANK KONYVKA.

Witnesses:
JOHN A. BOMMHARDT,
G. V. ROSENBERG.